(12) United States Patent
Sasaki et al.

(10) Patent No.: US 11,796,553 B2
(45) Date of Patent: Oct. 24, 2023

(54) AUTOMATIC ANALYSIS SYSTEM

(71) Applicant: Hitachi High-Tech Corporation, Tokyo (JP)

(72) Inventors: Nobuhiko Sasaki, Tokyo (JP); Takanori Sawada, Tokyo (JP); Toshiyuki Shimamori, Tokyo (JP); Chie Yabutani, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 506 days.

(21) Appl. No.: 17/265,726

(22) PCT Filed: Jun. 27, 2019

(86) PCT No.: PCT/JP2019/025684
§ 371 (c)(1),
(2) Date: Feb. 3, 2021

(87) PCT Pub. No.: WO2020/066189
PCT Pub. Date: Apr. 2, 2020

(65) Prior Publication Data
US 2021/0293841 A1 Sep. 23, 2021

(30) Foreign Application Priority Data

Sep. 26, 2018 (JP) ................................. 2018-179759

(51) Int. Cl.
*G01N 35/10* (2006.01)
*G01N 35/00* (2006.01)

(52) U.S. Cl.
CPC ..... *G01N 35/1011* (2013.01); *G01N 35/1002* (2013.01); *G01N 2035/00178* (2013.01)

(58) Field of Classification Search
CPC .......... G01N 35/1011; G01N 35/1002; G01N 2035/00178; G01N 35/1016; G01N 2035/1018; G01N 2035/1025
See application file for complete search history.

(56) References Cited

U.S. PATENT DOCUMENTS 9,470,570 B2 10/2016 Nishida et al.
2011/0223682 A1 9/2011 Wakamiya

FOREIGN PATENT DOCUMENTS

JP H08-94642 A 4/1996
JP H08-210896 A 8/1996
(Continued)

OTHER PUBLICATIONS

Extended European Search Report dated May 31, 2022 for European Patent Application No. 19866988.9.

*Primary Examiner* — Tarun Sinha
(74) *Attorney, Agent, or Firm* — Volpe Koenig

(57) ABSTRACT

A chemical dispensing mechanism detects the liquid surface of a chemical including a chemical container mounted on a chemical disk. A calculation control unit controls the operation of the chemical dispensing mechanism. The calculation control unit performs a first raising operation, in which a chemical stored in the chemical container is suctioned by the chemical dispensing mechanism, which is then raised up to a first bubble detection position, determines whether a liquid surface is present, and outputs an alert indicating the presence of a bubble on the liquid surface when the liquid surface has been determined to be absent. The first bubble detection position is when the tip of a dispensing nozzle of the chemical dispensing mechanism remains inside the liquid when there are no bubbles present on the liquid surface, and is exposed from the inside of the liquid when there are bubbles present on the liquid surface.

13 Claims, 9 Drawing Sheets

(56) References Cited

FOREIGN PATENT DOCUMENTS

| | | |
|---|---|---|
| JP | H10-282116 A | 10/1998 |
| JP | 2007-322285 A | 12/2007 |
| JP | 2010-286324 A | 12/2010 |
| JP | 2011-203115 A | 10/2011 |
| JP | 5093164 B2 | 12/2012 |
| JP | 2013-148360 A | 8/2013 |
| JP | 2013-164358 A | 8/2013 |
| JP | 2015-017912 A | 1/2015 |
| JP | 2016-27309 A | 2/2016 |
| JP | 2016-205998 A | 12/2016 |

AUTOMATIC ANALYSIS SYSTEM

TECHNICAL FIELD

The present invention relates to an automatic analysis system, and particularly to a technique effective for detecting a bubble on a liquid surface at a time of dispensing a liquid sample or a reagent.

BACKGROUND ART

In an automatic analysis device that performs qualitative and quantitative analysis of components of a specimen such as blood or urine, a liquid surface check may be performed to determine whether a dispensing amount is accurate when, for example, a sample or a reagent is dispensed.

In the liquid surface check, it is important to detect a bubble generated on a liquid surface. When a bubble is generated on a liquid surface, the bubble may be erroneously detected as the liquid surface, and reagent capacity may not be accurately managed.

As a technique for detecting the bubble, for example, there has been known a technique for detecting a bubble by measuring a pressure waveform during a suction operation of a reagent, and a technique for detecting a bubble in a reagent bottle by image processing.

As a liquid surface detection technique of this type of automatic analysis device, there has been a technique of obtaining a difference between a liquid surface height after a suction operation obtained based on a liquid surface height detected during a previous probe lowering operation and a liquid surface height actually detected during a current probe lowering operation, and detecting a presence of a bubble when the difference exceeds a first threshold value and is equal to or less than a second threshold value set to be larger than the first threshold value (for example, see PTL 1).

In addition, as a technique for determining an accurate dispensing amount in this type of automatic analysis device, there has been a technique in which a raising operation of a certain amount and a liquid surface check are performed twice after a dispensing mechanism suctions a reagent and before a raising operation, and when a liquid surface is detected at each timing of the two liquid surface checks, it is determined that an accurate dispensing amount is dispensed (for example, see PTL 2).

There have been various methods of detecting a liquid surface. For example, JP-A-8-210896 and JP-A-8-94642 describe a capacitive liquid surface detection method.

In these methods, a probe is used as a sensor for detecting the liquid surface, and a liquid surface is detected based on a fact that static capacitance between the probe and a disk holding a container is different between when a tip end of the probe is in air and when the tip end of the probe is in a liquid.

CITATION LIST

Patent Literature

PTL 1: JP-A-2016-27309
PTL 2: JP-A-10-282116
PTL 3: JP-A-8-210896
PTL 4: JP-A-8-94642

SUMMARY OF INVENTION

Technical Problem

In the technique of measuring a pressure waveform of a liquid surface, a bubble is detected by measuring a pressure waveform of a suction operation and comparing the pressure waveform with a pressure waveform when the liquid surface without a bubble is suctioned. However, in this case, a function of measuring the pressure waveform at the time of suction is required. As a result, cost of the automatic analysis device may increase.

In the technique of detecting a bubble by image processing, a presence or absence of a bubble is detected by capturing an image of an inside of a reagent bottle, performing image processing, and comparing the processed image with an image of a liquid surface without a bubble. In this case as well, similarly, a capturing function of capturing an image of the inside of the reagent bottle, an image processing function, and the like are additionally required, and cost of the automatic analysis device increases.

In addition, in the technique of PTL 1, when the generated bubble is not broken, the difference in the liquid surface heights does not exceed a threshold value. For this reason, it may be difficult to detect a bubble that is strong enough not to be broken by contact with the dispensing mechanism.

In the technique of PTL 2, when the bubble is not broken in any of the two liquid surface checks, the liquid surface is erroneously detected in each of the liquid surface checks. Therefore, in this case as well, it may be difficult to detect a bubble that is strong enough not to be broken by contact with the dispensing mechanism.

An object of the invention is to provide a technique capable of detecting a bubble present in a reagent or the like with high accuracy while preventing an increase in cost.

The above and other objects and novel features of the invention will become apparent from the description of this specification and the accompanying drawings.

Solution to Problem

Typical aspects of the invention disclosed in the present application will be briefly described as follows.

That is, a typical automatic analysis system includes an automatic analysis device and a terminal device. The automatic analysis device analyzes a sample. The terminal device is connected to the automatic analysis device.

The automatic analysis device includes a reagent dispensing mechanism and a reagent disk. The reagent dispensing mechanism includes a liquid surface sensor that detects a liquid surface of a reagent, suctions and dispenses the reagent. A reagent container 122 that stores a reagent used for analysis of a sample is mounted on the reagent disk.

The terminal device includes a calculation control unit that generates a control signal for controlling an operation of the reagent dispensing mechanism. The calculation control unit performs a first raising operation in which the reagent stored in the reagent container is suctioned by the reagent dispensing mechanism and the reagent dispensing mechanism is then raised to a first bubble detection position, performs a first liquid surface detection that determines whether the liquid surface is present by acquiring a detection result of the liquid surface sensor, and outputs an alert indicating presence of a bubble on the liquid surface when the liquid surface is determined to be absent by the first liquid surface detection.

The first bubble detection position is a position at which a tip end portion of a dispensing nozzle of the reagent dispensing mechanism remains inside a liquid when there are no bubbles present on the liquid surface and the tip end portion of the dispensing nozzle is exposed from the liquid when there are bubbles present on the liquid surface.

Further, the calculation control unit performs a second raising operation in which the reagent dispensing mechanism is raised to a second bubble detection position when the liquid surface is determined to be present by the first liquid surface detection, performs a second liquid surface detection that determines whether the liquid surface is present by acquiring a detection result of the liquid surface sensor, and outputs an alert indicating presence of a bubble on the liquid surface when a liquid surface is determined to be present by the second liquid surface detection.

The second bubble detection position is a position at which the tip end portion of the dispensing nozzle of the reagent dispensing mechanism is exposed from the liquid surface when there are no bubbles present on the liquid surface and the tip end portion of the dispensing nozzle of the reagent dispensing mechanism comes into contact with bubbles when there are bubbles present on the liquid surface.

Advantageous Effect

Effects obtained by typical aspects of the invention disclosed in the present application will be briefly described as follows.

Analysis of a specimen component can be performed with high accuracy without increasing cost of an automatic analysis system.

DESCRIPTION OF EMBODIMENTS

The same components are generally denoted by the same reference symbols throughout the drawings for describing an embodiment, and the repetitive description thereof will be omitted.

Hereinafter, the embodiment will be described in detail.

<Configuration Example of Automatic Analysis System>

Figure 1:
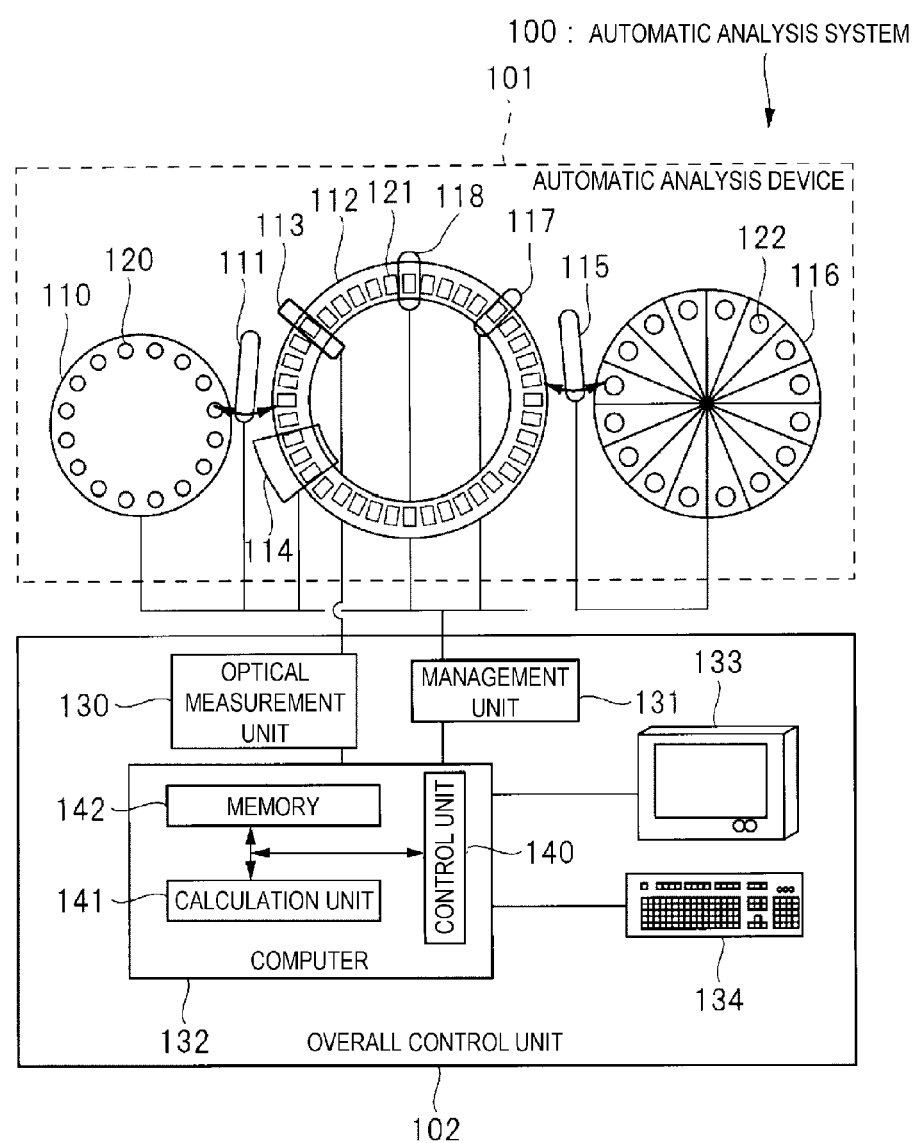
FIG. 1 is an explanatory diagram showing an example of a configuration of an automatic analysis system according to an embodiment.

FIG. 1 is an explanatory diagram showing an example of a configuration of an automatic analysis system according to the present embodiment.

An automatic analysis system 100 can measure various components such as sugar, cholesterol, protein, and enzyme using a body fluid component such as blood and urine as a specimen, and can also measure items of immune serum, tumor marker, coagulation tests, and the like.

As shown in FIG. 1, the automatic analysis system 100 includes an automatic analysis device 101 and an overall control unit 102. The automatic analysis device 101, which is a terminal device, includes a sample disk 110, a sample dispensing mechanism 111, a reaction disk 112, an optical measurement mechanism 113, a reaction container cleaning mechanism 114, a reagent dispensing mechanism 115, a reagent disk 116, a sound wave radiation mechanism 117, a stirring mechanism 118, and the like.

Sample storage containers 120 that store samples are mounted on the sample disk 110. The sample storage container 120 is a container that stores a biological sample such as blood or urine. The sample dispensing mechanism 111 is provided in a vicinity of a right side of the sample disk 110. The sample dispensing mechanism 111 suctions and dispenses the sample.

The reaction disk 112 is provided on a right side of the sample dispensing mechanism 111. Reaction containers 121 in which a sample and a reagent react with each other are annularly arranged on the reaction disk 112. The optical measurement mechanism 113, the reaction container cleaning mechanism 114, and the sound wave radiation mechanism 117 are provided in the vicinity of the reaction disc 112.

The optical measurement mechanism 113 includes, for example, a spectrophotometer, and measures absorbance of a reaction solution. The reaction container cleaning mechanism 114 cleans the reaction containers 121. The sound wave radiation mechanism 117 deaerates the reaction solution in the reaction containers 121 by irradiating the reaction solution with sound waves. That is, gas dissolved in the liquid is removed. The stirring mechanism 118 stirs the reaction solution in the reaction containers 121.

The reagent dispensing mechanism 115 is provided on a right side of the reaction disk 112. The reagent dispensing mechanism 115 suctions and dispenses a reagent. The reagent disk 116 is provided on a right side of the reagent dispensing mechanism 115. Reagent containers 122 are mounted on the reagent disk 116. The reagent container 122 is a container that stores a reagent used for analysis of a sample.

The overall control unit 102 includes an optical measurement unit 130, a management unit 131, a computer 132, a display unit 133, an input unit 134, and the like. The optical measurement unit 130 performs analysis processing of a measurement result by the optical measurement mechanism 113.

The management unit 131 controls, based on a control signal output from the computer 132, operations of the sample disk 110, the sample dispensing mechanism 111, the reaction disk 112, the reaction container cleaning mechanism 114, the reagent dispensing mechanism 115, the reagent disk 116, and the like.

The computer 132 includes, for example, a personal computer and controls the entire automatic analysis system 100. The computer 132 includes a control unit 140, a calculation unit 141, a memory 142, and the like. The control unit 140 and the calculation unit 141 constitute a calculation control unit.

The control unit 140 generates the control signal described above and outputs the control signal to the management unit 131. The calculation unit 141 calculates a concentration of a target component in a sample based on the analysis processing by the optical measurement unit 130. A result calculated by the calculation unit 141 is output to the control unit 140. The control unit 140 causes the display unit 133 to display a calculation result received from the calculation unit 141, that is, the concentration of the target component in the sample.

The memory 142 includes, for example, a non-volatile memory exemplified by a flash memory, and a hard disk drive, and stores the measurement result analyzed and processed by the optical measurement unit 130 and various kinds of other data.

The display unit 133 includes a display such as a liquid crystal display, and displays the measurement result, information related to various operations, an alert, or the like. The input unit 134 includes, for example, a keyboard and a mouse, and inputs various kinds of data. Alternatively, a pointing device such as a tablet or a touch panel may be used as the display unit 133 and the input unit 134.

<Dispensing Operation of Reagent and Sample>

Next, the dispensing operation of the reagent and the sample performed in the analysis operation by the automatic analysis system 100 will be described.

Operations described below are mainly performed by the control unit 140, and the management unit 131 controls, based on a control signal output from the control unit 140, operations of the sample disk 110, the sample dispensing mechanism 111, the reaction disk 112, the reaction container cleaning mechanism 114, the reagent dispensing mechanism 115, and the reagent disk 116.

First, the sample placed on the sample disk 110 is dispensed from the sample storage containers 120 to the reaction containers 121 by the sample dispensing mechanism 111. As the reaction disk 112 is rotated, the reaction containers 121 that store the sample are moved to a reagent dispensing position.

The reagent dispensing mechanism 115 dispenses the reagent used for analysis from the reagent containers 122 to the reaction containers 121 containing the sample. Here, a mixed solution of the sample and the reagent, which is stored in the reaction container 121, is referred to as a reaction solution.

Subsequently, the sound wave radiation mechanism 117 deaerates the reaction solution in the reaction containers 121 by irradiating the reaction solution with sound waves. Thereafter, the stirring mechanism 118 stirs the reaction solution in the reaction containers 121. The reaction containers 121 are kept at a constant temperature of, for example, about 37° C., by a constant-temperature bath circulating liquid (not shown) filled in a lower portion of the reaction disk 112. This promotes the reaction and stabilizes the progress of the reaction.

Subsequently, the reaction containers 121 are caused to pass through the optical measurement mechanism 113 by rotating the reaction disk 112. The optical measurement unit 130 measures a change in optical characteristics when the reaction containers 121 pass through the optical measurement mechanism 113, and outputs the measurement result to the computer 132.

In the computer 132, the calculation unit 141 calculates the concentration of the target component in the sample from a result measured by the optical measurement unit 130. A calculation result by the calculation unit 141 is stored in the memory 142. In addition, the control unit 140 causes the display unit 133 to display the calculation result of the calculation unit 141.

The reaction containers 121 after the reaction are cleaned by the reaction container cleaning mechanism 114 and repeatedly used in a next reaction. Alternatively, the reaction containers 121 are discarded to a reaction container discarding unit (not shown) or the like without being used again.

<Bubble Detection Operation>

Next, the dispensing operation and a bubble detection operation performed by the automatic analysis system 100 will be described. In the dispensing operation described above, the bubble detection operation is performed for detecting bubbles present in the reagent containers 122 or bubbles present in the reaction containers 121. The bubble detection operation is performed using a liquid surface sensor 115*a*, which will be described later, provided in the reagent dispensing mechanism 115 of the automatic analysis device 101 in advance.

FIGS. 2A-2E are an explanatory diagram showing an example of the dispensing operation and the bubble detection operation when a sample and a reagent are dispensed by the automatic analysis system in FIG. 1. FIGS. 3A-3D are an explanatory diagram continued from FIGS. 2A-2E.

In FIGS. 2A-2E and FIGS. 3A-3D, attention is paid to the reagent containers 122, the reaction containers 121, and the reagent dispensing mechanism 115 that dispenses the reagent to the reaction containers 121, and a case where bubbles are generated in the reagent of the reagent containers 122 is shown.

Here, the operation of the reagent dispensing mechanism 115 is mainly controlled by the control unit 140 in FIG. 1. That is, the management unit 131 controls the operation of the reagent dispensing mechanism 115 based on the control signal output from the control unit 140.

When dispensing the reagent, the reagent dispensing mechanism 115 is lowered to a liquid surface of the reagent stored in the reagent container 122. Hereinafter, the dispensing operation and the bubble detection operation performed by the automatic analysis system 100 will be described in detail. Here, an example of the bubble detection operation by the reagent dispensing mechanism 115 will be described.

Figure 2A:
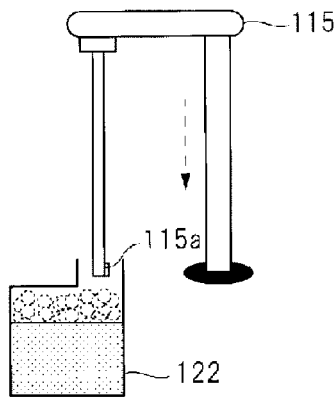
FIGS. 2A-2E are an explanatory diagram showing an example of a dispensing operation when a sample and a reagent are dispensed by the automatic analysis system in FIG. 1.

First, the control unit 140 moves the reagent dispensing mechanism 115 to a position above the reagent containers 122 containing the reagent. Then, as shown in FIG. 2A, the control unit 140 lowers the reagent dispensing mechanism 115 while checking the presence or absence of the liquid surface.

Here, as shown in FIGS. 2A-2E, the liquid surface sensor 115*a* is provided at a tip end portion of a dispensing nozzle of the reagent dispensing mechanism 115. A detection signal of the liquid surface sensor 115*a* is input to the control unit 140. The control unit 140 determines the presence or absence of a liquid surface based on the detection signal from the liquid surface sensor 115*a*.

Figure 2B:
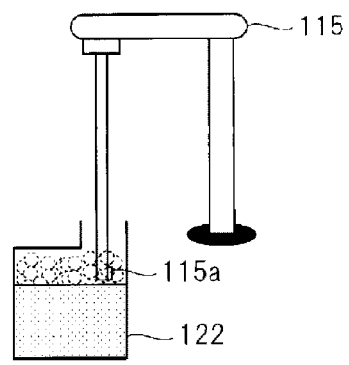

When the liquid surface is detected, the control unit 140 stops lowering the reagent dispensing mechanism 115 as shown in FIG. 2B. In FIG. 2B, since bubbles are generated in the reagent of the reagent container 122, the control unit 140 determines the bubbles generated in the reagent as the liquid surface.

When the reagent dispensing mechanism 115 is stopped, the control unit 140 checks the presence or absence of the liquid surface again. In this check, the control unit 140 also erroneously detects bubbles generated on the liquid surface and determines that a liquid surface is present.

Figure 2C:
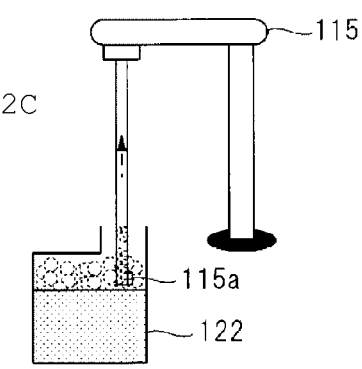
Figure 2D:
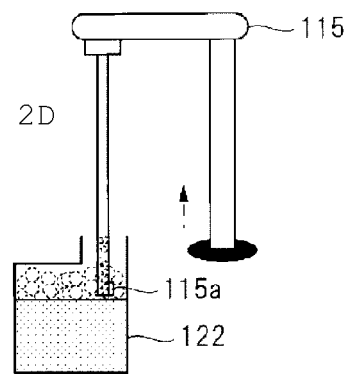

Subsequently, as shown in FIG. 2C, the control unit 140 causes the reagent dispensing mechanism 115 to suction a preset dispensing amount of reagent from the reagent container 122. Thereafter, as shown in FIG. 2D, the control unit 140 slightly raises the reagent dispensing mechanism 115, and then performs the liquid surface check and the bubble detection, which are first liquid surface determination, again. In this case, a raising amount of the reagent dispensing mechanism 115 is such that the tip end portion of the dispensing nozzle remains inside the liquid when a liquid surface is normal. The slight raising operation is a first raising operation, and a position of the dispensing nozzle at this time is a first bubble detection position.

Figure 6:
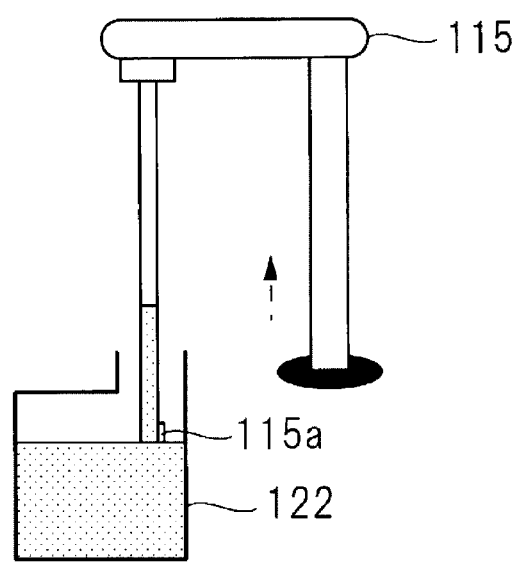
FIG. 6 is an explanatory diagram showing an example when a liquid surface is normal in a bubble detection operation in FIGS. 2A-2E.

Here, when strength of the bubbles generated on the liquid surface of the reagent is weak, the bubbles are broken by stimulus due to the rising of the dispensing nozzle. Therefore, in the liquid surface check after the dispensing nozzle slightly rises, the control unit 140 determines that the liquid surface is normal when a liquid surface as shown in FIG. 6 is present.

There may be bubbles present on the liquid surface of the reagent when the liquid surface is absent, and thus the control unit 140 causes the display unit 133 to display an alert indicating that bubbles may be generated in the reagent. Alternatively, the control unit 140 may output an alarm sound from, for example, a speaker (not shown) provided in the display unit 133 or the like to be known.

Figure 4:
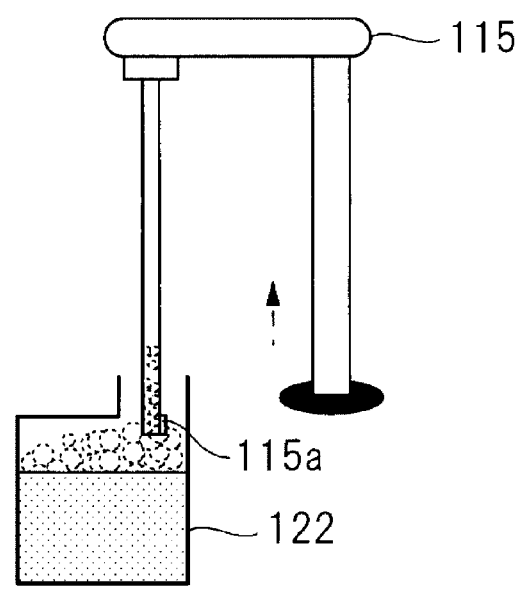
FIG. 4 is an explanatory diagram showing another example of a slight raising operation of a nozzle of a reagent dispensing mechanism in FIGS. 2A-2E.

When the strength of the bubbles generated on the liquid surface of the reagent is high, the bubbles may not disappear due to the slight rising of the dispensing nozzle. As an operation for detecting such bubbles, the control unit 140 performs, after the liquid surface check described above, second liquid surface detection and the bubble detection operation by slightly raising the dispensing nozzle of the reagent dispensing mechanism 115 again as shown in FIG. 4. The second liquid surface detection may be performed alone without performing the first liquid surface check described above.

In this case, the raising amount of the reagent dispensing mechanism 115 is such that the tip end portion of the dispensing nozzle is separated from the liquid surface of the reagent, for example, by about 1 mm. This slight raising operation is a second raising operation, and a position of the dispensing nozzle at that time is a second bubble detection position. In this state, the control unit 140 determines whether a liquid surface is present. In the case of strong bubbles, it is determined that the liquid surface is present because the bubbles remain at the tip end portion of the dispensing nozzle or the like without being broken.

Figure 7:
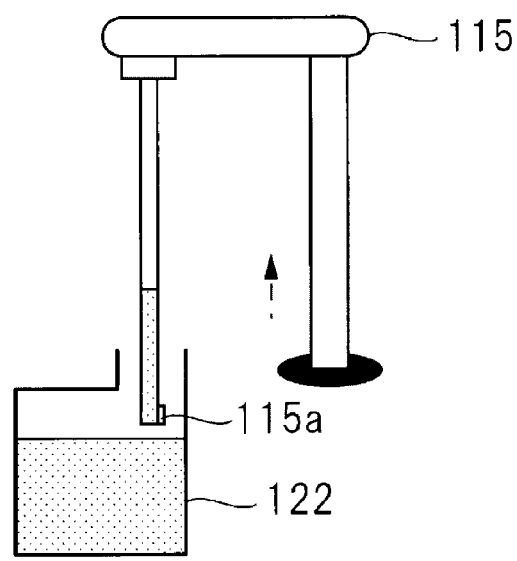
FIG. 7 is an explanatory diagram showing an example when a liquid surface is normal in a bubble detection operation in FIG. 6.

When it is determined that the liquid surface is present, the control unit 140 causes the display unit 133 to display an alert indicating that bubbles may be generated in the reagent. In addition, as shown in FIG. 7, when the liquid surface is absent, the control unit 140 determines that there are no bubbles and the liquid surface is normal, and proceeds to the next operation.

As a result, it is possible to easily detect not only a bubble that has a weak strength and is broken by the raising operation of the dispensing nozzle or the like, in other words, a bubble that is easily broken, but also a bubble that has a strong strength and is not broken by the raising operation of the dispensing nozzle or the like, in other words, a bubble that is not easily broken, and to allow a user or the like to know the bubble.

Here, in the operation shown in FIG. 2C, when bubbles around the dispensing nozzle are completely suctioned by a suction operation of the reagent dispensing mechanism 115, the control unit 140 rotates the reagent dispensing mechanism 115 before, during, or after the slight raising operation shown in FIG. 2D or the slight raising operation shown in FIG. 4. In this case, a rotation range of the reagent dispensing mechanism 115 is set to such a degree that the reagent dispensing mechanism 115 does not come into contact with a container opening of the reagent container 122. As a result, it is possible to level the bubbles that are concentrated in a periphery of the dispensing nozzle or the like, and thus it is possible to improve accuracy of the bubble detection.

For example, assuming that a diameter of the reagent container 122 is about 20 mm, a rotation amount is preferably about 5 mm in consideration of a rotation error and the like. This is a fixed value that does not depend on dispensing conditions, and is an operation amount that experimentally determines an optimum value.

Figure 2E:
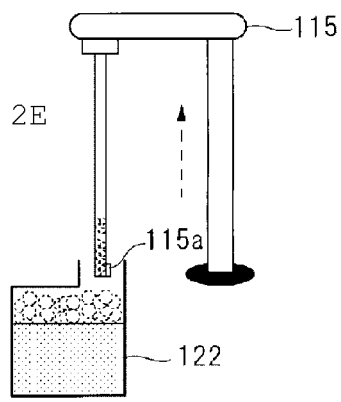

Subsequently, as shown in FIG. 2E, the control unit 140 raises the reagent dispensing mechanism 115 to a predetermined position, and then moves the reagent dispensing mechanism 115 to a position above the reaction container 121 containing the sample or the like to dispense the reagent from the dispensing nozzle of the reagent dispensing mechanism 115.

Figure 3A:
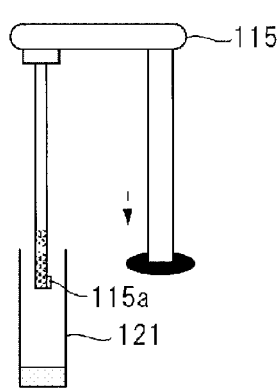
FIGS. 3A-3D are an explanatory diagram continuing from FIGS. 2A-2E.
Figure 3B:
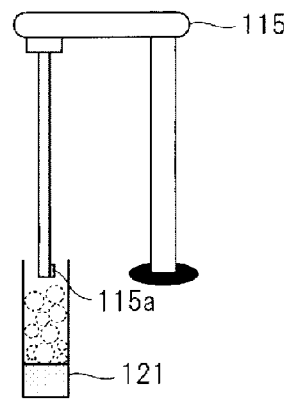

After the reagent is dispensed, the control unit 140 detects the liquid surface of the reaction solution of the sample and the reagent, as shown in FIG. 3A. At this time, when a determination result indicates that a liquid surface is present, the control unit 140 determines that the liquid surface is abnormal. This is because dispensed bubbles have a large volume and may rise in the reaction container 121 and come into contact with the dispensing nozzle of the reagent dispensing mechanism 115. Further, when a liquid surface is absent, it is determined the liquid surface is normal. In a bubble detection operation shown in FIG. 3A, bubbles having a higher strength than that of bubbles that are broken by stimulus due to the rising of the dispensing nozzle are detected.

Accordingly, it is possible to detect bubbles that are strong enough not to be broken by contact with the dispensing nozzle of the reagent dispensing mechanism 115 or the like by only a mechanism that detects a liquid surface, that is, the existing liquid surface sensor 115a, without adding a new mechanism.

Figure 3C:
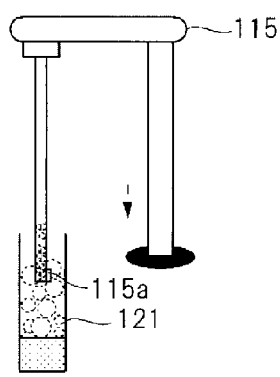

Thereafter, as shown in FIG. 3C, the control unit 140 performs the liquid surface check and the bubble detection, which are a third liquid surface detection, after the dispensing nozzle of the reagent dispensing mechanism 115 is slightly lowered to such an extent that the dispensing nozzle does not come into contact with the reaction solution of the sample and the reagent in the reaction container 121. This slight lowering operation is a first lowering operation, and a position of the dispensing nozzle at that time is a third bubble detection position.

In the liquid surface detection, when a liquid surface is present, the control unit 140 determines that the liquid surface is abnormal. This is because, in this case as well, bubbles have a large volume and may rise in the reaction container 121 and come into contact with the dispensing nozzle of the reagent dispensing mechanism 115.

Figure 8:
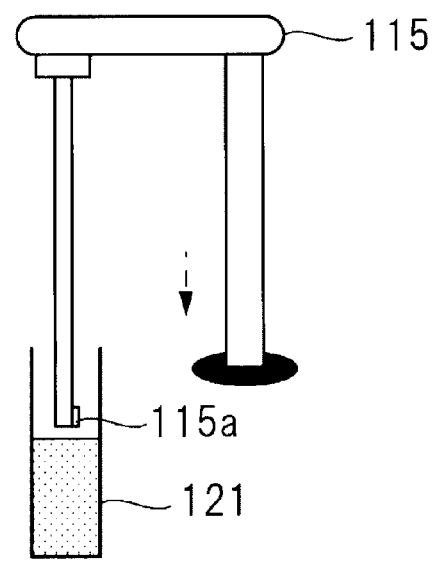
FIG. 8 is an explanatory diagram showing an example when a liquid surface is normal in a bubble detection operation in FIGS. 3A-3D.

When it is determined that the liquid surface is abnormal, the control unit 140 causes the display unit 133 to display an alert indicating that bubbles may be generated in the reagent. When a liquid surface as shown in FIG. 8 is present, the control unit 140 determines that the liquid surface is normal.

Figure 5:
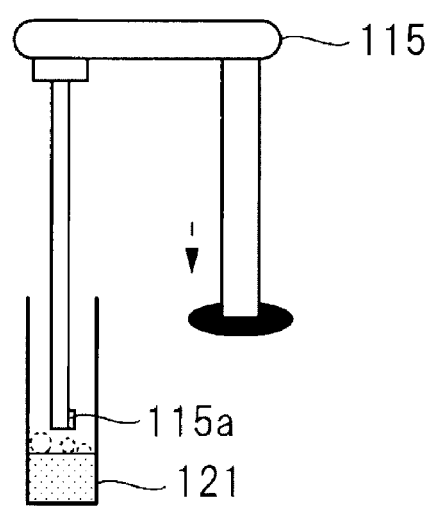
FIG. 5 is an explanatory diagram showing another example of a slight lowering operation of the nozzle of the reagent dispensing mechanism in FIGS. 3A-3D.
Figure 9:
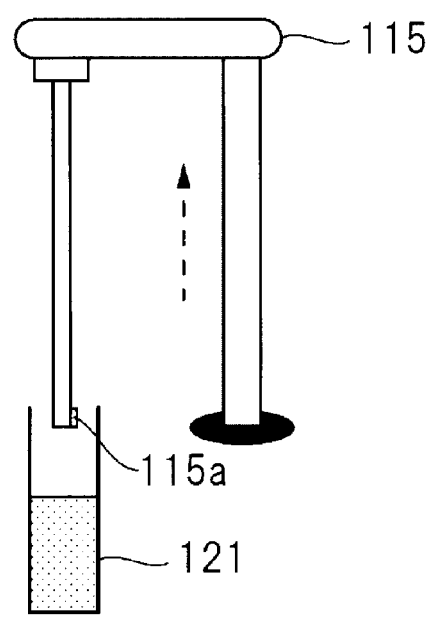
FIG. 9 is an explanatory diagram showing an example when a liquid surface is normal in a bubble detection operation in FIG. 5.

Alternatively, as shown in FIG. 5, the control unit 140 may perform a slight lowering operation to such an extent that the dispensing nozzle of the reagent dispensing mechanism 115 comes into contact with the reaction solution of the sample and the reagent in the reaction container 121 after the reagent is dispensed, and may perform the liquid surface check and the bubble detection which are a fourth liquid surface detection. The slight lowering operation is a second lowering operation, and a position of the dispensing nozzle at this time is a fourth bubble detection position. Here, when a liquid surface as shown in FIG. 9 is present, the control unit 140 determines that the liquid surface is normal. The fourth liquid surface detection may be performed alone without performing the third liquid surface detection described above.

When a liquid surface is absent, the control unit 140 determines that the liquid surface is abnormal. This is because, in this case, the reagent dispensing mechanism 115 may air-suction the reagent containing bubbles, and the dispensing amount may be smaller than setting. When it is determined that the liquid surface is abnormal, the control unit 140 causes the display unit 133 to display an alert indicating that bubbles may be generated in the reagent.

As a result, it is possible to detect a bubble having a weaker strength than that of the bubble at the time of the bubble detection in FIG. 3C. Note that bubble detection in FIG. 5 may be performed after the bubble detection in FIG. 3C.

Figure 3D:
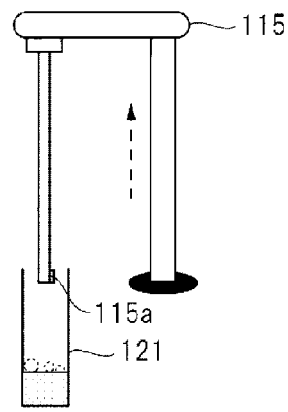

Thereafter, as shown in FIG. 3D, the control unit 140 raises the reagent dispensing mechanism 115 to a predetermined position and returns the reagent dispensing mechanism 115 to the predetermined position.

Thus, the operation of the bubble detection processing ends. The alerts indicating that bubbles may be generated in the reagent may be collectively displayed on the display unit 133 before or after the processing in FIG. 3D.

<Raising Amount and Lowering Amount of Reagent Dispensing Mechanism>

Here, in the slight raising operation and the slight lowering operation of the dispensing nozzle of the reagent dispensing mechanism 115 described above, it is desirable to calculate an operation amount based on a set amount of the dispensing amount and operate the reagent dispensing mechanism 115 by the operation amount.

Hereinafter, calculation of the raising amount of the slight raising operation and a lowering amount of the slight lowering operation of the reagent dispensing mechanism 115 will be described.

In order to simplify the description, preconditions for the operation of the reagent dispensing mechanism 115 will be defined. It is noted that the preconditions vary depending on properties of the sample and the reagent.

First, in the operation in FIG. 2B, a position where the tip end portion of the dispensing nozzle of the reagent dispensing mechanism 115 stops is about 3 mm below the liquid surface. In the operation in FIG. 2C, the reagent dispensing mechanism 115 lowers the liquid surface by about 1 mm by the suction operation. That is, when the reagent dispensing mechanism 115 performs the raising operation of about 2 mm or more after suction, the reagent dispensing mechanism 115 reaches the liquid surface or air.

Hereinafter, it is assumed that the raising amount and the lowering amount of the reagent dispensing mechanism 115 are calculated by the calculation unit 141 provided in the computer 132 in, for example, FIG. 1, and the control unit 140 generates a control signal for controlling the operation of the reagent dispensing mechanism 115 based on the calculation result.

In the operation in FIG. 3D, the tip end portion of the dispensing nozzle of the reagent dispensing mechanism 115 is located about 10 mm above the liquid surface. That is, when the reagent dispensing mechanism 115 performs the lowering operation of about 10 mm or more, the tip end portion of the dispensing nozzle of the reagent dispensing mechanism 115 reaches the reaction solution. The dispensing amount of the reagent and the sample is set to 250 µl in total.

The slight raising amount after suction based on these preconditions is calculated.

Base on a suction amount of the reagent and a size of the reagent container 122, an amount of the liquid surface lowered by the suction operation of the reagent dispensing mechanism 115 can be calculated from Equation 1. Here, it is assumed that a height by which a liquid surface is lowered by the suction operation is about 1 mm.

$$\text{Height (mm) by which liquid surface is lowered by suction operation} = \frac{\text{reagent suction amount (mm)}}{\text{reagent bottle cross-sectional area (mm)}} \quad \text{(Equation 1)}$$

Here, due to surface tension and viscosity of the reagent, the raising amount from the liquid surface required for the dispensing nozzle of the reagent dispensing mechanism 115 to completely separate from the liquid surface is required to be about 1 mm from the liquid surface.

On the other hand, it is assumed that, when the dispensing nozzle of the reagent dispensing mechanism 115 is only 0.5 mm away from the liquid surface of the reagent, the dispensing nozzle of the reagent dispensing mechanism 115 comes into contact with the liquid surface. This is a fixed value that does not depend on the dispensing conditions and is a parameter that experimentally determines an optimum value.

In addition, in order to ensure the tip end of the dispensing nozzle of the reagent dispensing mechanism 115 not to come out of the liquid surface during the suction operation, it is assumed that the suction need to start at a position where the tip end portion of the dispensing nozzle is lowered by about 3 mm from the liquid surface. This is a fixed value that does not depend on the dispensing conditions and is a parameter that experimentally determines an optimum value.

These assumptions are expressed by numerical values good to discriminate in order to make the description easy to understand.

Based on these conditions, in the slight raising operation shown in FIG. 2D, the raising amount after which the tip end portion of the dispensing nozzle remains inside the liquid when a liquid surface is normal, that is, a liquid surface has no bubbles, is obtained from Equation 2, and can be calculated as about 2.5 mm here.

$$\text{Raising amount (mm) of slight raising operation} = \text{lowering position (3 mm) from liquid surface at start of suction} - \text{height (1 mm) by which liquid surface is lowered by suction operation} + \text{upper limit value (0.5 mm) of raising amount from liquid surface after which dispensing mechanism can come into contact with liquid surface} \quad \text{(Equation 2)}$$

On the other hand, in the slight raising operation shown in FIG. 4, when the liquid surface is normal, the raising amount after which the tip end portion of the dispensing nozzle comes out of the liquid by about 1 mm is obtained from Equation 3, and can be calculated as about 3.0 mm here.

$$\text{Raising amount (mm) of slight raising operation} = \text{lowering position (3 mm) from liquid surface at start of suction} - \text{height (1 mm) by which liquid surface is lowered by suction}$$

operation+raising amount (1 mm) from liquid
surface required to completely separate from
liquid surface  (Equation 3)

<Another Example of Bubble Detection Operation>

After the slight raising amount after suction described above is calculated, it is also possible to omit the slight raising operation and perform bubble determination. When it is not desired to provide time for performing the slight raising operation after suction, the bubble determination may be performed by performing the liquid surface detection during the existing raising operation.

In this case, time until reaching the first bubble detection position or the second bubble detection position described above is calculated, and the liquid surface detection is performed when the time calculated during the existing raising operation has elapsed. When performing the liquid surface detection at the first bubble detection position or the second bubble detection position, the control unit 140 calculates the time until reaching the first bubble detection position or the second bubble detection position based on a raising operation speed before starting the raising operation shown in FIG. 2D, and when the raising operation is started, the control unit 140 performs the liquid surface detection at a time point when the time has elapsed to determine the presence or absence of the liquid surface.

When the liquid surface detection cannot be performed in real time and the presence or absence of the liquid surface can be detected only in a certain cycle, for example, a cycle of about 25 ms, the liquid surface detection is performed by changing the speed of the raising operation of the reagent dispensing mechanism 115.

In this case, the control unit 140 sets the raising operation speed of the reagent dispensing mechanism 115 so that the reagent dispensing mechanism 115 reaches the slight raising operation after about 25 ms, performs the liquid surface detection after about 25 ms when the raising operation is started, and performs the bubble determination based on the presence or absence of the liquid surface.

<Lowering Amount of Reagent Dispensing Mechanism>

Subsequently, the lowering amount of the reagent dispensing mechanism 115 in the lowering operation is calculated.

In the lowering operation of the reagent dispensing mechanism 115 shown in FIG. 3D, it is assumed that the reagent is dispensed after the tip end portion of the dispensing nozzle is lowered to a position about 15 mm above a bottom of the reaction container 121. This is a fixed value that does not depend on dispensing conditions and is an operation amount that experimentally determines an optimum value.

The liquid surface height of the reaction container 121 can be calculated according to the sample and reagent dispensing amount and the size of the reaction container 121 as in Equation 4. Here, it is assumed that the liquid surface height of the reaction container 121 is about 5 mm.

Reaction cell liquid surface height (mm)=sample and
reagent dispensing amount (mm$^3$) at time of
dispensing÷reaction cell cross-sectional area
(mm$^2$)  (Equation 4)

Here, it is assumed that, due to the surface tension, viscosity, or the like of the sample and the reagent, the position required for the tip end portion of the dispensing nozzle of the reagent dispensing mechanism 115 to be completely separated from a reaction solution surface needs to be located about 1 mm above the liquid surface.

On the other hand, it is assumed that, when the tip end portion of the dispensing nozzle of the reagent dispensing mechanism 115 is located about 0.5 mm below the liquid surface, the dispensing nozzle of the reagent dispensing mechanism 115 completely comes into contact with the reaction solution. This is a fixed value that does not depend on the dispensing conditions and is a parameter that experimentally determines an optimum value.

Based on these conditions, the lowering amount of the slight lowering operation in FIG. 3C is expressed by Equation 5, and can be calculated as about 9.0 mm here.

Lowering amount (mm) of slight lowering
operation=distance (15 mm) from bottom of
reaction cell to dispensing mechanism at time
of dispensing reagent−height (5 mm) of reac-
tion cell liquid−position (1 mm) from liquid
surface required to completely separate from
liquid surface  (Equation 5)

On the other hand, the lowering amount of the slight lowering operation shown in FIG. 5 is expressed by Equation 6, and can be calculated as about 3.0 mm here.

Lowering amount (mm) of slight lowering
operation=distance (15 mm) from bottom of
reaction cell to dispensing mechanism at time
of dispensing reagent−height (5 mm) of reac-
tion cell liquid+position (0.5 mm) from liquid
surface required to completely come into con-
tact with liquid surface  (Equation 6)

Accordingly, it is possible to notify the user of an abnormality by detecting bubbles from weak bubbles to strong bubbles without adding a new bubble detection function or the like to the automatic analysis system 100. As a result, the accuracy of the sample analysis can be improved without increasing the cost of the automatic analysis system 100.

While the invention has been described in detail based on the embodiment, the invention is not limited to the above-described embodiment and various modifications can be made without departing from the scope of the invention.

The invention is not limited to the embodiment described above and includes various modifications. For example, the above-described embodiment has been described in detail for easy understanding of the invention, and is not necessarily limited to one having all the configurations described above.

Further, a part of a configuration of one embodiment can be replaced with a configuration of another embodiment, and a configuration of another embodiment can be added to a configuration of one embodiment. A part of a configuration of each embodiment may be added to, deleted from, or replaced with another configuration.

REFERENCE SIGN LIST

100 automatic analysis system
101 automatic analysis device
102 overall control unit
110 sample disk
111 sample dispensing mechanism
112 reaction disk
113 optical measurement mechanism
114 reaction container cleaning mechanism
115 reagent dispensing mechanism
115*a* liquid surface sensor
116 reagent disk
117 sound wave radiation mechanism
118 stirring mechanism
120 sample storage container
120 reagent storage container
121 reaction container 122 reagent container
130 optical measurement unit
131 management unit
132 computer
133 display unit
134 input unit
140 control unit
141 calculation unit
142 memory

The invention claimed is:

1. An automatic analysis system, comprising:
an automatic analysis device configured to analyze a sample; and
a terminal device connected to the automatic analysis device, wherein
the automatic analysis device includes:
a reagent dispensing mechanism including a liquid surface sensor, the liquid surface sensor being configured to detect a liquid surface of a reagent, and configured to suction and dispense the reagent; and
a reagent disc on which a reagent container that stores a reagent to be used for analysis of the sample is mounted,
the terminal device includes a calculation control unit configured to generate a control signal for controlling an operation of the reagent dispensing mechanism,
the calculation control unit performs a first raising operation in which the reagent stored in the reagent container is suctioned by the reagent dispensing mechanism and the reagent dispensing mechanism is then raised to a first bubble detection position, performs a first liquid surface detection that determines whether the liquid surface is present by acquiring a detection result of the liquid surface sensor, and outputs an alert indicating presence of a bubble on the liquid surface when the liquid surface is determined to be absent by the first liquid surface detection, and
the first bubble detection position is a position at which a tip end portion of a dispensing nozzle of the reagent dispensing mechanism remains inside a liquid when there are no bubbles present on the liquid surface and the tip end portion of the dispensing nozzle of the reagent dispensing mechanism is exposed from the liquid when there are bubbles present on the liquid surface.

2. The automatic analysis system according to claim 1, wherein
the calculation control unit rotates the reagent dispensing mechanism at any timing before the first raising operation, during the first raising operation, and after the first raising operation.

3. The automatic analysis system according to claim 1, wherein
the calculation control unit performs a second raising operation in which the reagent dispensing mechanism is raised to a second bubble detection position when the liquid surface is determined to be present by the first liquid surface detection, performs a second liquid surface detection that determines whether the liquid surface is present by acquiring a detection result of the liquid surface sensor, and outputs an alert indicating presence of a bubble on the liquid surface when the liquid surface is determined to be present by the second liquid surface detection, and
the second bubble detection position is a position at which the tip end portion of the dispensing nozzle of the reagent dispensing mechanism is exposed from the liquid surface when there are no bubbles present on the liquid surface and the tip end portion of the dispensing nozzle of the reagent dispensing mechanism comes into contact with bubbles when there are bubbles present on the liquid surface.

4. The automatic analysis system according to claim 3, wherein
the calculation control unit rotates the reagent dispensing mechanism at any timing before the second raising operation, during the second raising operation, and after the second raising operation.

5. The automatic analysis system according to claim 3, further comprising:
a display unit configured to display the alert output from the calculation control unit.

6. An automatic analysis system, comprising:
an automatic analysis device configured to analyze a sample; and
a terminal device connected to the automatic analysis device, wherein
the automatic analysis device includes:
a reagent dispensing mechanism including a liquid surface sensor, the liquid surface sensor being configure to detect a liquid surface of a reagent, and configured to suction and dispense the reagent; and
a reagent disc on which a reagent container that stores a reagent to be used for analysis of the sample is mounted,
the terminal device includes a calculation control unit configured to generate a control signal for controlling an operation of the reagent dispensing mechanism,
the calculation control unit performs a second raising operation in which the reagent stored in the reagent container is suctioned by the reagent dispensing mechanism and the reagent dispensing mechanism is then raised to a second bubble detection position, performs a second liquid surface detection that determines whether the liquid surface is present by acquiring a detection result of the liquid surface sensor, and outputs an alert indicating presence of a bubble on the liquid surface when the liquid surface is determined to be present by the second liquid surface detection, and
the second bubble detection position is a position at which a tip end portion of a dispensing nozzle of the reagent dispensing mechanism is exposed from the liquid surface when there are no bubbles present on the liquid surface and the tip end portion of the dispensing nozzle of the reagent dispensing mechanism comes into contact with bubbles when there are bubbles present on the liquid surface.

7. The automatic analysis system according to claim 6, wherein
the calculation control unit rotates the reagent dispensing mechanism at any timing before the second raising operation, during the second raising operation, and after the second raising operation.

8. The automatic analysis system according to claim 6, further comprising:
a display unit configured to display the alert output from the calculation control unit.

9. An automatic analysis system, comprising:
an automatic analysis device configured to analyze a sample; and
a terminal device connected to the automatic analysis device, wherein
the automatic analysis device includes:

a reagent dispensing mechanism including a liquid surface sensor, the liquid surface sensor being configured to detect a liquid surface of a reagent, and configured to suction and dispense the reagent;

a reagent disk on which a reagent container that stores a reagent to be used for analysis of a sample is mounted; and a reaction disk on which a reaction container is mounted, the sample and the reagent being configured to react with each other in the reaction container, the terminal device includes a calculation control unit configured to generate a control signal for controlling an operation of the reagent dispensing mechanism, the calculation control unit performs a first lowering operation in which the reagent suctioned from the reagent container is dispensed to the reaction container and the reagent dispensing mechanism is then lowered to a third bubble detection position, performs a third liquid surface detection that determines whether the liquid surface is present by acquiring a detection result of the liquid surface sensor, and outputs an alert indicating presence of a bubble on the liquid surface when the liquid surface is determined to be present by the third liquid surface detection, and the third bubble detection position is a position at which a tip end portion of a dispensing nozzle of the reagent dispensing mechanism is exposed from the liquid surface when there are no bubbles present on the liquid surface and the tip end portion of the dispensing nozzle of the reagent dispensing mechanism comes into contact with bubbles when there are bubbles present on the liquid surface.

10. The automatic analysis system according to claim 9, wherein the calculation control unit performs a second lowering operation in which the reagent dispensing mechanism is lowered to a fourth bubble detection position when the liquid surface is determined to be absent by the third liquid surface detection, performs a fourth liquid surface detection that determines whether the liquid surface is present by acquiring a detection result from the liquid surface sensor, and outputs an alert indicating presence of a bubble on the liquid surface when the liquid surface is determined to be absent by the fourth liquid surface detection, and the fourth bubble detection position is a position at which the tip end portion of the dispensing nozzle of the reagent dispensing mechanism is exposed from the liquid surface when there are no bubbles present on the liquid surface and the tip end portion of the dispensing nozzle of the reagent dispensing mechanism comes into contact with bubbles when there are bubbles present on the liquid surface.

11. The automatic analysis system according to claim 10, further comprising:

a display unit configured to display the alert output from the calculation control unit.

12. An automatic analysis system, comprising:

an automatic analysis device configured to analyze a sample; and a terminal device connected to the automatic analysis device, wherein the automatic analysis device includes:

a reagent dispensing mechanism including a liquid surface sensor, the liquid surface sensor being configured to detect a liquid surface of a reagent, and configured to suction and dispense the reagent;

a reagent disk on which a reagent container that stores a reagent to be used for analysis of a sample is mounted; and a reaction disk on which a reaction container is mounted, the sample and the reagent being configured to react with each other in the reaction container, the terminal device includes a calculation control unit configured to generate a control signal for controlling an operation of the reagent dispensing mechanism, the calculation control unit performs a second lowering operation in which the reagent suctioned from the reagent container is dispensed to the reaction container and the reagent dispensing mechanism is then lowered to a fourth bubble detection position, performs a fourth liquid surface detection that determines whether the liquid surface is present by acquiring a detection result from the liquid surface sensor, and outputs an alert indicating presence of a bubble on the liquid surface when the liquid surface is determined to be absent by the fourth liquid surface detection, and the fourth bubble detection position is a position at which a tip end portion of a dispensing nozzle of the reagent dispensing mechanism is exposed from the liquid surface when there are no bubbles present on the liquid surface and the tip end portion of the dispensing nozzle of the reagent dispensing mechanism comes into contact with bubbles when there are bubbles present on the liquid surface.

13. The automatic analysis system according to claim 12, further comprising:

a display unit configured to display the alert output from the calculation control unit.

* * * * *